(12) United States Patent
Knorr et al.

(10) Patent No.: US 10,591,913 B2
(45) Date of Patent: Mar. 17, 2020

(54) METHOD FOR TRANSMITTING, RECEIVING AND PROCESSING DATA VALUES, AND A TRANSMISSION DEVICE AND RECEIVING DEVICE

(71) Applicant: Robert Bosch GmbH, Stuttgart (DE)

(72) Inventors: Moritz Michael Knorr, Hildesheim (DE); Alexander Geraldy, Hildesheim (DE); Christian Skupin, Garbsen (DE); Daniel Zaum, Sarstedt (DE); Emre Cakar, Sarstedt (DE); Hanno Homann, Hannover (DE); Holger Mielenz, Ostfildern (DE); Isabella Hinterleitner, Hildeshiem (DE); Jochen Marx, Emmerke (DE); Lukas Klejnowski, Hannover (DE); Markus Langenberg, Hannover (DE); Michael Pagel, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 316 days.

(21) Appl. No.: 15/377,388

(22) Filed: Dec. 13, 2016

(65) Prior Publication Data
US 2017/0168484 A1    Jun. 15, 2017

(30) Foreign Application Priority Data
Dec. 14, 2015   (DE) ........................ 10 2015 225 157

(51) Int. Cl.
*G05D 1/00*  (2006.01)
*B60R 16/023* (2006.01)
*H04L 29/08* (2006.01)

(52) U.S. Cl.
CPC ......... *G05D 1/0061* (2013.01); *B60R 16/023* (2013.01); *H04L 67/12* (2013.01); *G05D 2201/0213* (2013.01)

(58) Field of Classification Search
None
See application file for complete search history.

(56) References Cited

U.S. PATENT DOCUMENTS

| | | | | |
|---|---|---|---|---|
| 7,894,951 B2 * | 2/2011 | Norris | ..................... | H04L 67/12 180/443 |
| 8,346,426 B1 * | 1/2013 | Szybalski | ............. | B60W 50/14 701/28 |
| 8,718,861 B1 * | 5/2014 | Montemerlo | ......... | B60W 30/00 701/26 |
| 8,949,016 B1 * | 2/2015 | Ferguson | ............... | B60W 30/00 340/436 |

(Continued)

FOREIGN PATENT DOCUMENTS

DE    10 2012 112 802 A1    6/2014

*Primary Examiner* — Jonathan M Dager
(74) *Attorney, Agent, or Firm* — Norton Rose Fulbright US LLP; Gerard Messina

(57) ABSTRACT

A method for transmitting, receiving and processing data values, including detecting first data values, which represent at least one first transition from an automated operation of at least one first automated vehicle to a manual operation of the at least one first automated vehicle. The method also includes transmitting the first data values, receiving the first data values and a step of processing the first data values, and a transmission device and a receiving device for carrying out the method for transmitting, receiving and processing data values.

16 Claims, 3 Drawing Sheets

(56) References Cited

U.S. PATENT DOCUMENTS

| | | | | |
|---|---|---|---|---|
| 9,511,764 B2* | 12/2016 | Pilutti | B60W 30/00 | |
| 9,633,564 B2* | 4/2017 | Ferguson | G08G 1/166 | |
| 9,725,036 B1* | 8/2017 | Tarte | B60Q 9/00 | |
| 9,731,726 B2* | 8/2017 | Gordon | B60W 40/08 | |
| 9,785,145 B2* | 10/2017 | Gordon | G05D 1/0061 | |
| 9,823,657 B1* | 11/2017 | Palmer | G05D 1/0061 | |
| 9,834,224 B2* | 12/2017 | Gordon | B60W 50/082 | |
| 9,836,973 B2* | 12/2017 | Gordon | G08G 1/097 | |
| 9,944,291 B2* | 4/2018 | Gordon | B60W 30/182 | |
| 10,019,003 B2* | 7/2018 | Ryu | G05D 1/0061 | |
| 10,019,017 B2* | 7/2018 | Taguchi | B60W 30/00 | |
| 10,029,701 B2* | 7/2018 | Gordon | B60W 50/12 | |
| 10,093,322 B2* | 10/2018 | Gordon | B60W 50/0097 | |
| 10,101,743 B2* | 10/2018 | Abe | G05D 1/0061 | |
| 10,133,273 B2* | 11/2018 | Linke | G08G 1/00 | |
| 10,152,060 B2* | 12/2018 | Gordon | G05D 1/0214 | |
| 10,410,250 B2* | 9/2019 | Singhal | B60W 50/08 | |
| 2004/0107042 A1* | 6/2004 | Seick | G08G 1/0104 | 701/117 |
| 2004/0193363 A1* | 9/2004 | Schmidt | A01B 69/007 | 701/23 |
| 2006/0220883 A1* | 10/2006 | Matos | A62B 99/00 | 340/573.1 |
| 2007/0198145 A1* | 8/2007 | Norris | B60T 7/22 | 701/23 |
| 2008/0087488 A1* | 4/2008 | Palmer | A01B 69/008 | 180/308 |
| 2011/0241862 A1* | 10/2011 | Debouk | B60W 50/038 | 340/439 |
| 2012/0083964 A1* | 4/2012 | Montemerlo | G05D 1/0214 | 701/26 |
| 2012/0173530 A1* | 7/2012 | Kurciska | G08G 1/0112 | 707/738 |
| 2013/0131907 A1* | 5/2013 | Green | G05D 1/0055 | 701/23 |
| 2014/0156133 A1* | 6/2014 | Cullinane | B60K 35/00 | 701/23 |
| 2014/0375462 A1* | 12/2014 | Biondo | A61B 5/18 | 340/576 |
| 2015/0066282 A1* | 3/2015 | Yopp | G05D 1/0061 | 701/24 |
| 2015/0066284 A1* | 3/2015 | Yopp | B60W 30/00 | 701/29.2 |
| 2015/0149021 A1* | 5/2015 | Duncan | A61B 5/18 | 701/23 |
| 2015/0314780 A1* | 11/2015 | Stenneth | B60W 30/00 | 701/23 |
| 2015/0353088 A1* | 12/2015 | Ishikawa | G05D 1/0061 | 701/23 |
| 2015/0375699 A1* | 12/2015 | Lamprecht | B60R 16/037 | 701/2 |
| 2016/0041553 A1* | 2/2016 | Sato | B60W 30/143 | 701/23 |
| 2016/0140872 A1* | 5/2016 | Palmer | G06K 9/00791 | 434/65 |
| 2016/0209840 A1* | 7/2016 | Kim | G05D 1/0061 | |
| 2016/0257311 A1* | 9/2016 | Duncan | A61B 5/18 | |
| 2016/0280234 A1* | 9/2016 | Reilhac | B60K 35/00 | |
| 2016/0358475 A1* | 12/2016 | Prokhorov | G05D 1/0011 | |
| 2017/0003681 A1* | 1/2017 | Ross | B60W 50/029 | |
| 2017/0010612 A1* | 1/2017 | Asakura | G01C 21/3461 | |
| 2017/0021837 A1* | 1/2017 | Ebina | B60K 28/06 | |
| 2017/0050638 A1* | 2/2017 | Gordon | B60W 30/16 | |
| 2017/0057542 A1* | 3/2017 | Kim | B62D 15/025 | |
| 2017/0074667 A1* | 3/2017 | Laur | G01C 21/34 | |
| 2017/0102700 A1* | 4/2017 | Kozak | B60W 30/00 | |
| 2017/0123423 A1* | 5/2017 | Sako | G08G 1/00 | |
| 2017/0158191 A1* | 6/2017 | Bills | B60W 30/025 | |
| 2017/0203770 A1* | 7/2017 | Kondo | B60W 50/14 | |
| 2017/0227971 A1* | 8/2017 | Shimotani | B60W 30/12 | |
| 2017/0232974 A1* | 8/2017 | Nishida | G05D 1/0061 | 701/24 |
| 2017/0235305 A1* | 8/2017 | Jung | B60W 40/072 | 701/23 |
| 2017/0253241 A1* | 9/2017 | Filev | B60W 50/0097 | |
| 2017/0261981 A1* | 9/2017 | Ichikawa | G05D 1/0061 | |
| 2017/0303842 A1* | 10/2017 | Yoshida | A61B 5/0476 | |
| 2018/0113454 A1* | 4/2018 | Emura | B60W 30/182 | |
| 2018/0157256 A1* | 6/2018 | Oniwa | B60W 50/14 | |
| 2018/0162409 A1* | 6/2018 | Altmannshofer | G08G 1/096708 | |
| 2018/0162414 A1* | 6/2018 | Palmer | B60W 50/082 | |
| 2018/0208211 A1* | 7/2018 | Chiba | B60W 50/08 | |
| 2018/0239352 A1* | 8/2018 | Wang | G05D 1/0061 | |
| 2018/0245929 A1* | 8/2018 | Watanabe | H04W 4/40 | |
| 2018/0338117 A1* | 11/2018 | Park | G05D 1/0246 | |
| 2019/0276046 A1* | 9/2019 | Palmer | B60W 50/12 | |

* cited by examiner

METHOD FOR TRANSMITTING, RECEIVING AND PROCESSING DATA VALUES, AND A TRANSMISSION DEVICE AND RECEIVING DEVICE

RELATED APPLICATION INFORMATION

The present application claims priority to and the benefit of German patent application no. 10 2015 225 157.8, which was filed in Germany on Dec. 14, 2015, the disclosure of which is incorporated herein by reference.

FIELD OF THE INVENTION

The present invention relates to a method for transmitting, receiving and processing data values, these data values being related to transitions between an automated operation and a manual operation of an automated vehicle. The present invention also relates to a transmission unit as well as a receiving unit, which are configured to carry out the method according to the present invention.

BACKGROUND INFORMATION

Patent document DE 10 2012 112 802 A1 discusses a method for controlling a vehicle, which includes a driver assistance system enabling autonomous, semi-autonomous and manual driving, a surroundings detection unit, an evaluation unit evaluating the surroundings data generated by the surroundings detection unit for assessing the surroundings situation of the vehicle, and a hazard warning device controllable by the driver assistance system during autonomous or semi-autonomous driving for outputting a warning signal as a take-over prompt to the driver as a function of the assessment of the surroundings situation of the vehicle. In the process, the take-over probability, with which a driver intervention will soon likely be required, is determined with the aid of a risk assessment unit on the basis of the surroundings data and from driving-dynamics data of the vehicle during the autonomous or semi-autonomous driving. In addition, the driver's attention level is estimated with the aid of an attention estimation unit and, finally, a period of time until the warning signal is generated is determined from the take-over probability as a function of the driver's attention level.

SUMMARY OF THE INVENTION

The method according to the present invention for transmitting, receiving and processing data values and the devices for which they are provided, assume that first data values are detected, which represent at least one first transition from an automated operation of at least one first automated vehicle to a manual operation of the at least one first automated vehicle. A step of transmitting the first data values, a step of receiving the first data values and a step of processing the first data values are also provided.

The processing would be done by a processor as would be understood by a person having ordinary skill in the art.

The first vehicle described herein is a vehicle, which may be operated both manually, i.e., for example, by a driver, or also remotely controlled, as well as semi-automated or highly automated. A semi-automated or highly automated operation of a vehicle may be understood to mean both individual driver assistance functions such as, for example, an assistance during parking, as well as fully automated operations, such as longer drives on freeways, country roads or also in intra-urban areas.

A transition from an automated operation of a vehicle to a manual operation is understood to mean the taking control of the operation of the vehicle by a person, regardless of the type, duration, reason and extent of the automated operation previously taking place.

The method according to the present invention has the advantage that data on such transitions may be collected and evaluated. This allows for various analyses of the manner of implementation of such transitions. An analysis may be made, for example, of how these transitions impact the driving comfort for potential occupants of a vehicle in which such a transition takes place. In addition, conclusions may be drawn about the behavior of the operators of such a vehicle such as, for example, the duration with which a take-over occurs, or how the vehicle subsequently behaves. This may be a factor if a certain time span between the start and the end of a take-over, for example, has safety-relevant consequences. In this way, driver assistance systems or driver assistance functions for semi-automated or highly automated driving on the whole may be newly developed and improved. This is of great significance for the development of automated driving, since it is by no means natural for operators of present vehicles to surrender in the broadest sense the control of a vehicle to a driving function or to a device or a machine, whether it be when driving a vehicle or also during a remotely controlled operation.

As a result of the possibility of transmitting the recorded data, which permit an analysis of such a transition, and receiving it at another location, the analysis may be carried out in an arbitrarily accurate and effective manner, since receiving devices specifically provided for this purpose may be used for such an analysis.

The at least one first transition may be initiated by at least one vehicle operating system, which operates the at least one first automated vehicle in an automated manner.

It is here, in particular, that the advantage of the data analysis is demonstrated, since the limits of the automated operation of a vehicle, in particular, whether semi-automated or highly automated, may be detected and correspondingly evaluated. This is of great importance for the acceptance of the semi-automated or highly automated driving, as it relates to both comfort as well as safety.

In a particularly specific embodiment, the at least one first transition is initiated by the vehicle operating system as a function of the surroundings of the at least one first vehicle.

One of the most frequent reasons for the take-over of an automated vehicle by an operator is the excessive demand on an automated system due to the surroundings, which no longer ensures a reliable operation, for example, automated driving in an urban environment during heavy traffic or driving in fog on a freeway. Thus, the analysis of transitions as a function of the surroundings is of fundamental importance for automated driving.

Two data values may be detected, which represent at least one second transition from a manual operation of the at least one first automated vehicle to an automated operation of the at least one first automated vehicle.

For an analysis of transitions for advancement and improvement of automated driving, the transitions from a manual operation to an automated operation are extremely important for detecting when and how, for example, automated driver assistance systems may be engaged and utilized.

In one particularly specific embodiment, the first data values include localization data, which represent a localization of the at least one first automated vehicle during the at least one first transition. In addition, the second data values may additionally or alternatively also include localization data, which represent a localization of the at least one first automated vehicle during the at least one second transition.

In addition to the aforementioned transitions, which are a function of an impermanent condition of surroundings such as, for example, weather conditions, darkness, construction sites, traffic conditions, or events, which make normal traffic impossible, it is also important to be aware of permanent surroundings conditions, in particular, which necessitate a transition from an automated operation to a manual operation. This may involve, for example, various components of the traffic infrastructure, which require a manual operation. Other examples would be certain landscape features such as, for example, lakes, which lie very close to a narrow road or drives through mountain landscapes with precipices, which also require particular caution during driving and an exact awareness of the position of a vehicle relative to the road and lake or precipice. Thus, it is very important when detecting the necessity of a transition, to know a location of the vehicle which may be for each transition in order to also be able to analyze that aspect of the exact surroundings.

The first data values and/or the second data values may be processed in such a way that third data values are calculated, which include an evaluation of the first data values with respect to the at least one first transition and/or an evaluation of the second data values with respect to the at least one second transition.

A reliable and exact evaluation of the detected data values, in particular, is indispensable in terms of the quality of an analysis and, therefore a key aspect for the use and advancement of automated driving, as it relates to both comfort as well as safety and thus, ultimately acceptance.

The first data values and/or the second data values and/or the third data values may be inserted into at least one digital map.

Inserting the analyzed data into one map enhances the understanding of the transitions in general and the influence of the surroundings in particular. A map also facilitates the transfer of these findings and assists in the development of new maps and in the improvement and perfection of already existing maps, specifically maps which are necessary for automated driving.

In a particularly specific embodiment, the first and/or the second and/or the third data values and/or the at least one digital map are transmitted to at least one second automated vehicle and/or are retrieved by the at least one second vehicle.

The great advantage of the transfer of the detected data and/or the previously evaluated data offers the benefit that, in addition to the analysis for automated driving in general, other automated vehicles profit from this knowledge. Drivers may be warned earlier of a potential transition, for example, than if they had to rely exclusively on the systems of their own vehicle. Another important aspect could also be the planning of a route, in which no transition from an automated operation to a manual operation takes place. This would permit operators of trucks, for example, to drive longer distances at one stretch, since sufficient rest times could be included despite a continuous drive. In general, the amount of time freed up for the driver would be immensely increased.

The first data values and/or the second data values may be transmitted directly, in particular, with the aid of a satellite connection and/or a mobile radio connection and/or a car-2-car connection and/or another data value transmission link, and or indirectly, in particular, with the aid of a car-2-car connection via at least one third vehicle and/or with the aid of a data values transmission medium.

The advantage of a direct connection is the speed at which the data may be processed, transmitted and received. An indirect connection is advantageous if a data transmission is not directly possible as a result of external circumstances such as, for example, when driving through a valley, through a tunnel or in the case of a non-functioning transmission arrangement.

The transmission device according to the present invention for transmitting data values includes a first arrangement for detecting first data values, which represent at least one first transition from an automated operation of at least one first automated vehicle to a manual operation of the at least one first automated vehicle. Also included is a second arrangement for transmitting the first data values.

In one particularly specific embodiment, the transmission device includes a third arrangement, with the aid of which the at least one first transition is detected, when this transition is initiated by a vehicle operating system, which operates the at least one first automated vehicle in an automated manner. In addition, a fourth arrangement may be additionally or alternatively included, with the aid of which the at least one first transition is detected when this transition is carried out by the vehicle operating system as a function of the surroundings of the at least one first automated vehicle.

The transmission device may include a fifth arrangement, with the aid of which second data values are detected, which represent at least one second transition from a manual operation of the at least one first automated vehicle to an automated operation of the at least one first automated vehicle.

The transmission device may include a sixth arrangement, with the aid of which the first data values are detected in such a way that these first data values include localization data, which represent a localization of the at least one first automated vehicle during the at least one first transition. In addition, the second data values may additionally or alternatively be detected with the aid of the sixth arrangement in such a way that these second data values include localization data, which represent a localization of the at least one first automated vehicle during the at least one second transition.

The transmission device may include a seventh arrangement, with the aid of which the first data values and/or the second data values are transmitted directly, in particular, with the aid of a satellite connection and/or a mobile radio connection and/or a car-2-car connection and/or another data value transmission link. In addition, an eighth arrangement is also or alternatively included, with the aid of which the transmission takes place indirectly, via at least one additional transmission unit and receiving unit, in particular, with the aid of a car-2-car connection via at least one third vehicle and/or with the aid of a data values transmission medium.

The receiving device according to the present invention for receiving and processing data values includes an eleventh arrangement for receiving the first data values and/or the second data values. The receiving device also includes a twelfth arrangement for processing the first data values and/or the second data values.

In one particularly specific embodiment, the receiving device includes the twelfth arrangement in such a way that the first data values and/or the second data values are processed with the aid of the twelfth arrangement in such a way that third data values are calculated, which include an evaluation of the first data values with respect to the at least one first transition and/or second data values with respect to the at least one second transition. In addition, a thirteenth arrangement is alternatively or additionally included, with the aid of which the first data values and/or the second data values and/or the third data values are inserted into at least one digital map.

The receiving device may include a fourteenth arrangement, with the aid of which the processing takes place in such a way that the first data values and/or the second data values and/or the third data values and/or the at least one digital map are transmitted to at least one second automated vehicle and/or are retrieved by the at least one second automated vehicle.

Advantageous refinements of the present invention are specified in the further descriptions herein and presented in the description.

Exemplary embodiments of the present invention are depicted in the drawings and are explained in greater detail in the following descriptions.

DETAILED DESCRIPTION

Figure 1:
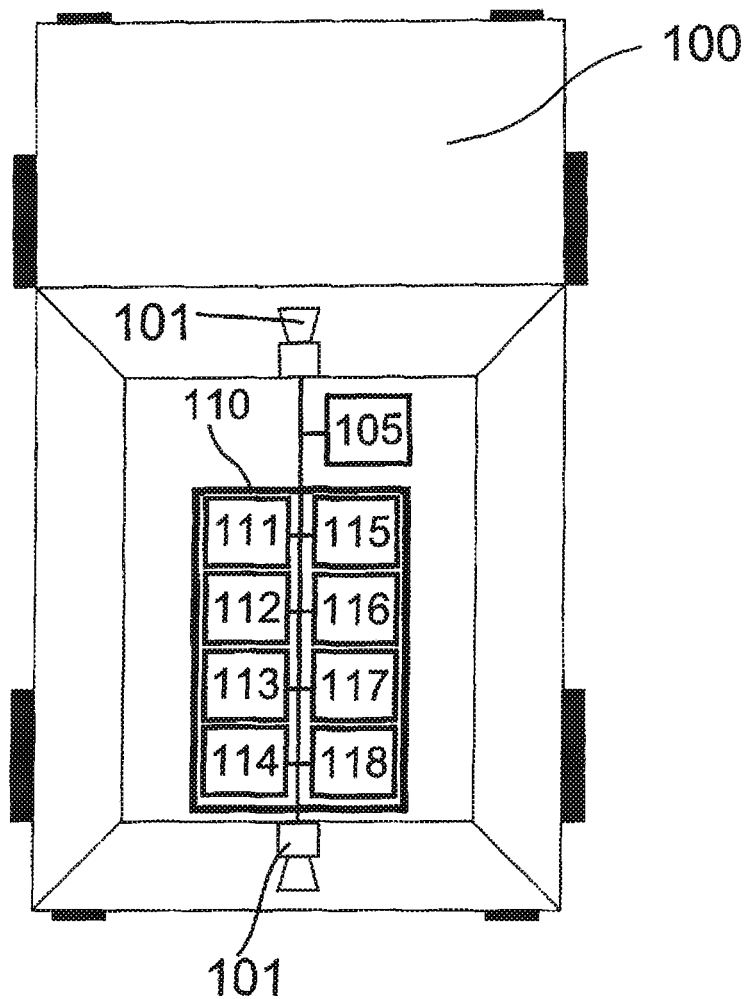
FIG. 1 shows, purely as an example, a vehicle which carries the transmission device according to the present invention for carrying out the method according to the present invention.

FIG. 1 shows a vehicle 100 which carries a transmission device 110 according to the method according to the present invention. The transmission device 110 includes, in part, first arrangement 111, with the aid of which first data values may be detected, which represent a transition from an automated operation of vehicle 100 to a manual operation. This may occur, for example, by one or multiple function detecting situations during one phase of the automated operation of vehicle 100, for example, in the form of an error message which, in turn, necessitates a take-over by an operator of vehicle 100. It may be an occupant or the driver of vehicle 100, or also an external operator, who operates vehicle 100, for example, remotely controlled. Due to the situation detected, which necessitates a take-over, a corresponding signal is automatically generated by first arrangement 111. If, for example, a driver of vehicle 100 takes over the control without initiation by the vehicle, the corresponding signal may be generated, for example by touching the steering wheel, the gas pedal, the gear shift or a remote control.

The detected first data values may be transmitted with the aid of second arrangement 112. This may on the one hand be an arrangement specifically provided for such a purpose, which are a fixed component of transmission device 110. On the other hand, second arrangement 112 may be configured in such a way that they carry out the transmission by resorting to an already existing transmission system of vehicle 100.

Third arrangement 113 enable the detection of a transition, specifically, when such a transition is caused by a vehicle operating system. Third arrangement 113 in this case is configured, for example, in such a way that it is able to interpret correspondingly detected situations in detail, as described above, for example, by storing a list of potential situations in this third arrangement. Due to fourth arrangement 114, all transitions occurring as a function of the surroundings of vehicle 100 may be filtered out of the detected transitions. Fourth arrangement 114 may, for example, include at least one sensor and one processing unit, which make it possible to detect the surroundings of vehicle 114 in such a way that a transition due to the surroundings is detected as such. The at least one sensor may, for example, be a radar sensor, a LIDAR sensor, a video sensor, an acceleration sensor, a temperature sensor, a GPS sensor, an infrared sensor, an ultrasonic sensor or any other arbitrary sensor, which is configured to correspondingly detect the surroundings of the vehicle 100. Fourth arrangement 114 in this case may also be configured in such a way that they include no separate sensors, but rather resort to already existing sensors 101 of vehicle. In addition, fourth arrangement 114 may also be configured in such a way that the surroundings of vehicle 100 are detected by the at least one sensor and a transition is initiated based on the detected surroundings, for example, when the surroundings do not permit an automated driving or an automated function, but a user must take over instead.

Second data values, which represent a transition from a manual operation of vehicle 100 to an automated operation, may also be detected with the aid of fifth arrangement 115. The transition may take place, for example, by actuating a corresponding control device in vehicle 100, a corresponding signal being generated which may be interpreted by fifth arrangement 115 as a transition.

Sixth arrangement 11) allow the transitions to be detected in such a way that the first and/or second data values, which describe the transition, also include localization data. The arrangement in this case may be a GPS sensor, for example. The sixth arrangement may also be configured in such a way that they are able to access a localization system already present in vehicle 100. Such a system in this case may be a navigation system or also a mobile telephone or some other mobile device, which is configured to carry out a localization and to transmit the corresponding data to vehicle 100. Once the localization data are detected, they may be added to the corresponding first and/or second data values, which describe the transition, by the first and/or second data values being present in the form of a file, in which all relevant data are entered and combined.

The transmission device also includes seventh arrangement 117, with the aid of which a transmission of the first and/or second data values to a receiving device 210 may be carried out. The first and/or second data values in this case are transmitted directly by transmission device 110 to receiving device 210, for example, via a satellite connection and/or mobile radio connection. Seventh arrangement 117 may also be configured in such a way that they utilize a data transmission device already present in vehicle 100 and, with the aid this device, transmit the first and/or second data values. This may be, for example, a navigation device and/or a hands-free set (which is connected to a transmission device). Alternatively, a direct connection in the form of a data transmission cable such as, for example, a fiber optic cable, is also possible, if, for example, the receiving device is also located in vehicle 100.

The first and/or second data values may also be transmitted indirectly to the receiving device with the aid of eighth arrangement 118. Eighth arrangement 118 in this case may be configured in such a way that they provide a connection, with the aid of which the transmission device may be connected to a data transmission medium, and the first and/or second data values may thereby be transmitted with the aid of this medium. The connection in this case may, for example, be a USB connection or also any other possible connection, which is configured in such a way as to enable a transmission according to the present invention. Another form of the indirect transmission would be, for example, the transmission of the first and/or second data values, similar to the direct transmission, but via intermediate stations, which are also configured to be able to transmit and to receive data. One possibility would be one or multiple additional vehicles, the first and/or second data values occurring by a car-2-car connection between first vehicle 100 which detects the data, and another vehicle.

Figure 2:
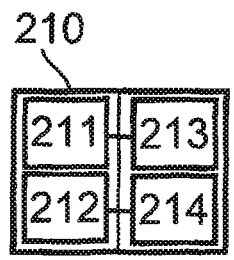
FIG. 2 shows, purely as an example, the receiving device according to the present invention.

FIG. 2 shows a receiving device 210, which is configured to receive and process the first and/or second data values. The receiving device includes eleventh arrangement 211 with the aid of which the first and/or second data values may be received. This may, for example, be the reception of a wireless transmission of these data values and/or also the reception by cable connection. Eleventh arrangement 211 may also be configured in such a way that data values, which have been transmitted by a data transmission medium, may also be received. This may, for example, be a USB connection or also any other possible connection, which is configured to enable a reception according to the present invention of the first and/or second data values.

The receiving device further includes twelfth arrangement 212, with the aid of which data or data values, in particular, the first and/or second data values, may be processed to form third data values. The first and/or second data values in this case may then be evaluated as to whether transitions have taken place and whether a particular reason for a transition or a particular localized point occurs with a particularly noticeable frequency. In this case, individual transitions or individual locations may be particularly weighted. In addition, data lists may be available to twelfth arrangement 212, which allow a comparison of individual transitions with one another and make a weighting possible. Twelfth arrangement 212 may, in particular, be a processing unit, with the aid of which the first and/or second data values are processed and evaluated according to predefined algorithms and functions.

The receiving device also includes thirteenth arrangement 213, with the aid of which the first data values and/or the second data values or the third data values may be linked to a map. In this case, a map may be already stored in the arrangement, which is correspondingly processed as a result of the addition of these data by inserting the data using programs and algorithms present in thirteenth arrangement 213.

A map may be stored, for example, as raw data, which are processed by addition of the first data and/or second data and/or third data, and subsequently stored in such a way that the resultant data may be brought by at least one additional program into a form, which allows them to be utilized by other programs such as, for example, the software of a navigation system.

With the aid of fourteenth arrangement 214 of receiving device 210, the first data values and/or the second data values and/or the third data values and/or a map may be transmitted to an (automated) vehicle or may be retrieved by an (automated) vehicle. A corresponding device, for example, may be present in a vehicle, which is operated in at least a semi-automated manner, which makes it possible to communicate with receiving device 210 in such a way that a map, which has been prepared, for example, according to the method described herein, is automatically retrieved or may also be called up at the request of an operator of the vehicle. This may serve the purpose, for example, of operating a navigation system in such a way that a route may be adjusted or calculated based on the requested map material.

Figure 3:
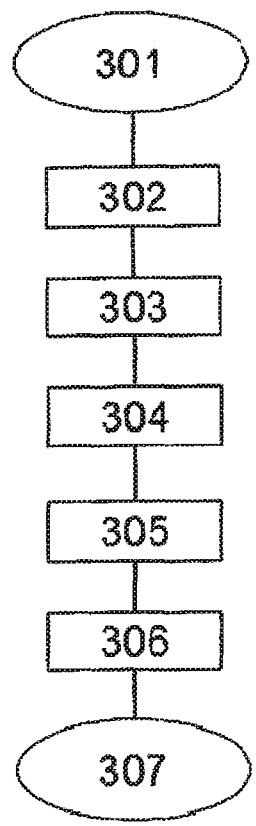
FIG. 3 shows, purely as an example, an exemplary embodiment in the form of a flow chart of the method according to the present invention using the devices according to the present invention.

FIG. 3 describes a flow chart of a possible exemplary embodiment of the method according to the present invention, or a possible use of transmission device 110 and receiving device 21) according to the present invention.

The method starts in step 301.

In step 302, first data values are detected, which describe a transition from an automated operation of at least one first automated vehicle 100 to a manual operation of vehicle 100.

In step 303, the surroundings of vehicle 100 are localized to the transition detected in step 302 and are correspondingly added to the data, which represent the detected transition.

In step 304, the first data values (which now include the localization data with respect to the transition, as well as a description of the transition) are transmitted to receiving device 210 with the aid of transmission device 110.

In step 305, the transmitted first data values are received by receiving unit 210.

In step 306, these received first data values are processed with the aid of the receiving device, i.e., the transition, which has been transmitted with the aid of the first data values, is analyzed and evaluated. In the process, the evaluated data values are stored in the form of third data values in such a way that a further analysis of these data values is also possible using additional programs and algorithms.

The method ends in step 307.

Figure 4:
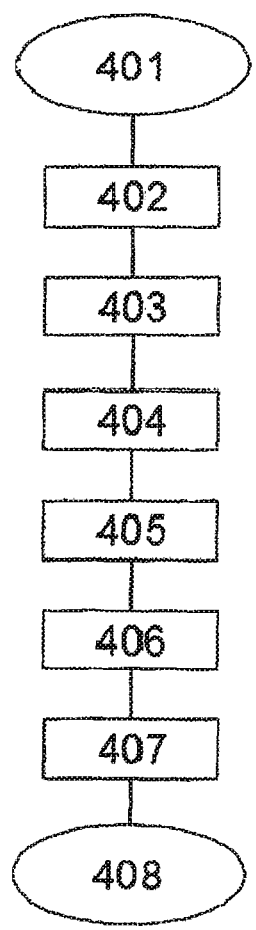
FIG. 4 shows, purely as an example, an exemplary embodiment in the form of a flow chart of the method according to the present invention using the devices according to the present invention.

FIG. 4 describes a flow chart of a possible exemplary embodiment of the method according to the present invention or a possible use of transmission device 110 and receiving device 210 according to the present invention.

The method starts in step 401.

In step 402, first data values are detected, which describe a transition from an automated operation of at least one first automated vehicle 100 to a manual operation of vehicle 100.

In step 403, the surroundings of vehicle 100 are localized to the transition detected in step 402 and are correspondingly added to the data, which represent the detected transition.

In step 404, the first data values (which now include the localization data with respect to the transition, as well as a description of the transition) are transmitted to receiving device 210 with the aid of transmission device 110.

In step 405, the transmitted first data values are received by receiving unit 210.

In step 406, these received first data values are processed with the aid of the receiving device, i.e., the transition, which has been transmitted with the aid of the first data values, is analyzed and evaluated, and subsequently entered into a map based on the localization data also sent.

In step 407, the map prepared in step 406 is stored in a format, which enables another vehicle to retrieve and accordingly use this map, for example, with the aid of a navigation system.

The method ends in step 408.

What is claimed is:

1. A method for transmitting, receiving and processing data values, the method comprising:

detecting first data values, which represent at least one first transition of an automated operation of at least one first automated vehicle to a manual operation of the at least one first automated vehicle, so that there is a detected transition;

transmitting, via a transmitting device, the first data values;

receiving, via a receiving device, the first data values; and processing, via a processor, the first data values;

wherein surroundings of the automated vehicle are localized to the detected transition and added to the first data values of the detected transition, wherein the at least one first transition of at least one vehicle operating system, which operates the at least one first automated vehicle in an automated manner, is initiated, wherein received first data values are processed with the receiving device, so that the transition, which has been transmitted with the aid of the first data values, is analyzed and evaluated, and entered into a map, wherein the map is stored in a format, which enables another vehicle to retrieve and use the map, and wherein the first data values include localization data, which represent a localization of the at least one first automated vehicle during the at least one first transition, wherein the first data values and the localization data represent a detected transition, and wherein the map includes the detected transition for use by the another vehicle.

2. The method of claim 1, wherein the initiation of the at least one first transition by the vehicle operating system occurs as a function of the surroundings of the at least one first automated vehicle.

3. The method of claim 1, wherein second data values are detected, which represent at least one second transition from a manual operation of the at least one first automated vehicle to an automated operation of the at least one first automated vehicle.

4. The method of claim 3, wherein the second data values include localization data, which represent a localization of the at least one first automated vehicle during the at least one second transition.

5. The method of claim 3, wherein the first data values and/or the second data values are processed so that third data values are calculated, which include an evaluation of the first data values with respect to the at least one first transition and/or an evaluation of the second data values with respect to the at least one second transition.

6. The method of claim 5, wherein the first data values and/or the second data values and/or the third data values are inserted in at least one digital map.

7. The method of claim 6, wherein the first data values and/or the second data values and/or the third data values and/or the at least one digital map is transmitted to at least one second automated vehicle and/or retrieved by the at least one second vehicle.

8. The method of claim 1, wherein the first data values and/or the second data values are transmitted directly, with a data value transmission link, and/or indirectly, with a car-2-car connection via at least one third vehicle and/or with a data evaluation transmission medium.

9. A transmission device for transmitting data values, comprising:
a transmission device configured to perform the following:
detecting first data values, which represent at least one first transition from an automated operation of at least one first automated vehicle to a manual operation of the at least one first automated vehicle, so that there is a detected transition; and transmitting the first data values;

wherein surroundings of the automated vehicle are localized to the detected transition and added to the first data values of the detected transition, wherein the at least one first transition of at least one vehicle operating system, which operates the at least one first automated vehicle in an automated manner, is initiated, wherein received first data values are processed with a processor, so that the transition, which has been transmitted with the aid of the first data values, is analyzed and evaluated, and entered into a map, and wherein the map is stored in a format, which enables another vehicle to retrieve and use the map, and wherein the first data values include localization data, which represent a localization of the at least one first automated vehicle during the at least one first transition, and wherein the map includes the detected transition for use by the another vehicle.

10. The transmission device of claim 9, wherein when the at least one first transition is detected when this transition is initiated by a vehicle operating system, the at least one first automated vehicle is operated in an automated manner, and wherein the at least one first transition is detected when this transition takes place by the vehicle operating system as a function of the surroundings of the at least one first automated vehicle.

11. The transmission device of claim 9, wherein second data values are detected, which represent a second transition from a manual operation of the at least one first automated vehicle to an automated operation of the at least one first automated vehicle.

12. The transmission device of claim 10, wherein the first data values are detected so that these first data values include localization data, which represent a localization of the at least one first automated vehicle during the at least one first transition, and/or the second data values are detected so that these second data values include localization data, which represent a localization of the at least one first automated vehicle during the at least one second transition.

13. The transmission device of claim 10, wherein the first data values and/or the second data values are transmitted directly, with the aid of a satellite connection and/or a mobile radio connection and/or a car-2-car connection and/or another data value transmission link, and wherein the transmission occurs indirectly via at least one additional transmission device and at least one additional receiving device, with the aid of a car-2-car connection via at least one third vehicle and/or with the aid of a data values transmission medium.

14. A receiving device for receiving and processing data values, comprising:
a receiving device configured to perform the following:
receiving first data values, which represent at least one first transition from an automated operation of at least one first automated vehicle to a manual operation of the at least one first automated vehicle, and/or second data values, which represent at least one second transition from a manual operation of the at least one first automated vehicle to an automated operation of the at least one first automated vehicle; and processing the first data values and/or the second data values;

wherein surroundings of the automated vehicle are localized to a detected transition and added to the first data values of the detected transition, wherein the at least one first transition of at least one vehicle operating system, which operates the at least one first automated vehicle in an automated manner, is initiated, wherein received first data values are processed with the receiving device, so that the transition, which has been transmitted with the aid of the first data values, is analyzed and evaluated, and entered into a map, and wherein the map is stored in a format, which enables another vehicle to retrieve and use the map, and wherein the first data values include localization data, which represent a localization of the at least one first automated vehicle during the at least one first transition, and wherein the map includes the detected transition for use by the another vehicle.

15. The receiving device of claim 14, wherein at least one of the following is satisfied:
- the first data values and/or the second data values are processed with a twelfth arrangement so that third data values are calculated, which include an evaluation of the first data values with respect to the at least one first transition and/or second data values with respect to the at least one second transition, and
- the first data values and/or the second data values and/or the third data values are inserted into at least one digital map.

16. The receiving device of claim 15, wherein the processing takes place so that the first data values and/or the second data values and/or the third data values and/or the at least one digital map are transmitted to at least one second automated vehicle and/or are retrieved by the at least one second automated vehicle.

* * * * *